(12) United States Patent
Chu et al.

(10) Patent No.: US 8,060,349 B2
(45) Date of Patent: Nov. 15, 2011

(54) METHOD OF DESIGNING A STATIC SYNCHRONOUS COMPENSATOR BASED ON PASSIVITY-BASED CONTROL

(75) Inventors: Chia-Chi Chu, Tao-Yuan (TW); Hung-Chi Tsai, Tao-Yuan (TW)

(73) Assignee: Chang Gung University, Tao-Yuan (TW)

( * ) Notice: Subject to any disclaimer, the term of this patent is extended or adjusted under 35 U.S.C. 154(b) by 966 days.

(21) Appl. No.: 11/687,448

(22) Filed: Mar. 16, 2007

(65) Prior Publication Data

US 2008/0232143 A1    Sep. 25, 2008

(51) Int. Cl.
*G06F 7/60* (2006.01)
(52) U.S. Cl. .......................................................... 703/2
(58) Field of Classification Search .................... 703/2
See application file for complete search history.

(56) References Cited

U.S. PATENT DOCUMENTS

| | | | |
|---|---|---|---|
| 6,862,199 | B2 | 3/2005 | Escobar et al. |
| 7,701,087 | B2 * | 4/2010 | Eckroad et al. .............. 307/46 |
| 2005/0012395 | A1 * | 1/2005 | Eckroad et al. .............. 307/44 |
| 2005/0015182 | A1 * | 1/2005 | Bebic et al. ................. 700/286 |

OTHER PUBLICATIONS

Hung-Chi Tsai, Chia-Chi Chu, Sheng-Hui Lee; Passivity-based Nonlinear STATCOM Controller Design for Improving Transient Stability of Power Systems; Dec. 5, 2005; ISBN: 0-7803-9114-4; INSPEC Accession #: 9262754; DOI: 10.1109/TDC.2005.1547093; Transmission and Distribution Conference and Exhibition: Asia and Pacific, 2005 IEEE/PES; pp. 1-5.*
Rao, P., Crow, M.L., and Yang, Z., STATCOM Control for Power System Voltage Control Applications, IEEE Transactions on Power Delivery, vol. 15, No. 4, Oct. 2000, pp. 1311-1317.

\* cited by examiner

*Primary Examiner* — Paul Rodriguez
*Assistant Examiner* — Juan C Ochoa (57) ABSTRACT

This invention presents a method of novel nonlinear control for designing Static Synchronous Compensators (STATCOM). A passivity-based approach is proposed for designing robust nonlinear STATCOM controller. The mathematical model of STATCOM will be represented by an Euler-Lagrange (EL) system corresponding to a set of EL parameters. By employing the Park's transformation, the differential geometry approach is used to investigate the power system dynamics with considering STATCOM under the synchronous d-q frame. The energy-dissipative properties of the proposed model derived in the synchronous d-q rotating frame are fully retained. This model also consider the dynamic response of the changable load. Finally, the passivity-based control is employed by using energy shaping and damping injection techniques to produce the proper control signals for Voltage Source Converter. So that the system embedded with STATCOM is more robust and stable.

6 Claims, 7 Drawing Sheets

METHOD OF DESIGNING A STATIC SYNCHRONOUS COMPENSATOR BASED ON PASSIVITY-BASED CONTROL

BACKGROUND OF THE INVENTION

1. Field of the Invention

This invention relates to a method of designing a non-linear controller in a power system and particularly to a method of designing a static synchronous compensators (STATCOM).

2. Description of Related Art

A concept of FACTS was originally proposed by a scholar of America, N. H. Higorani, being established at the end of years 1980' of century 20 around. FACTS uses a device structured with large-power electronic components to regulate the operation of an AC electric power system. The technology of large-power electronic component becomes popular and the component is cheap day by day. Besides, the mechanism of operation of electric power system control trends to market requests so that the system operation is more complicated and variable. In order to satisfy the technical economical requirements in all aspects for participants in the market, the electric power system must be capable of self-adjustment.

STATCOM is a shunt control device in FACTS. Currently, there are many STATCOM practically operating in the power system. The power system embeeded with STATCOM can improve the stability of power system; next, it may also provide the reactive power compensation for the weak bus, and increase the capacity of of a power transmission line.

Figure 1:
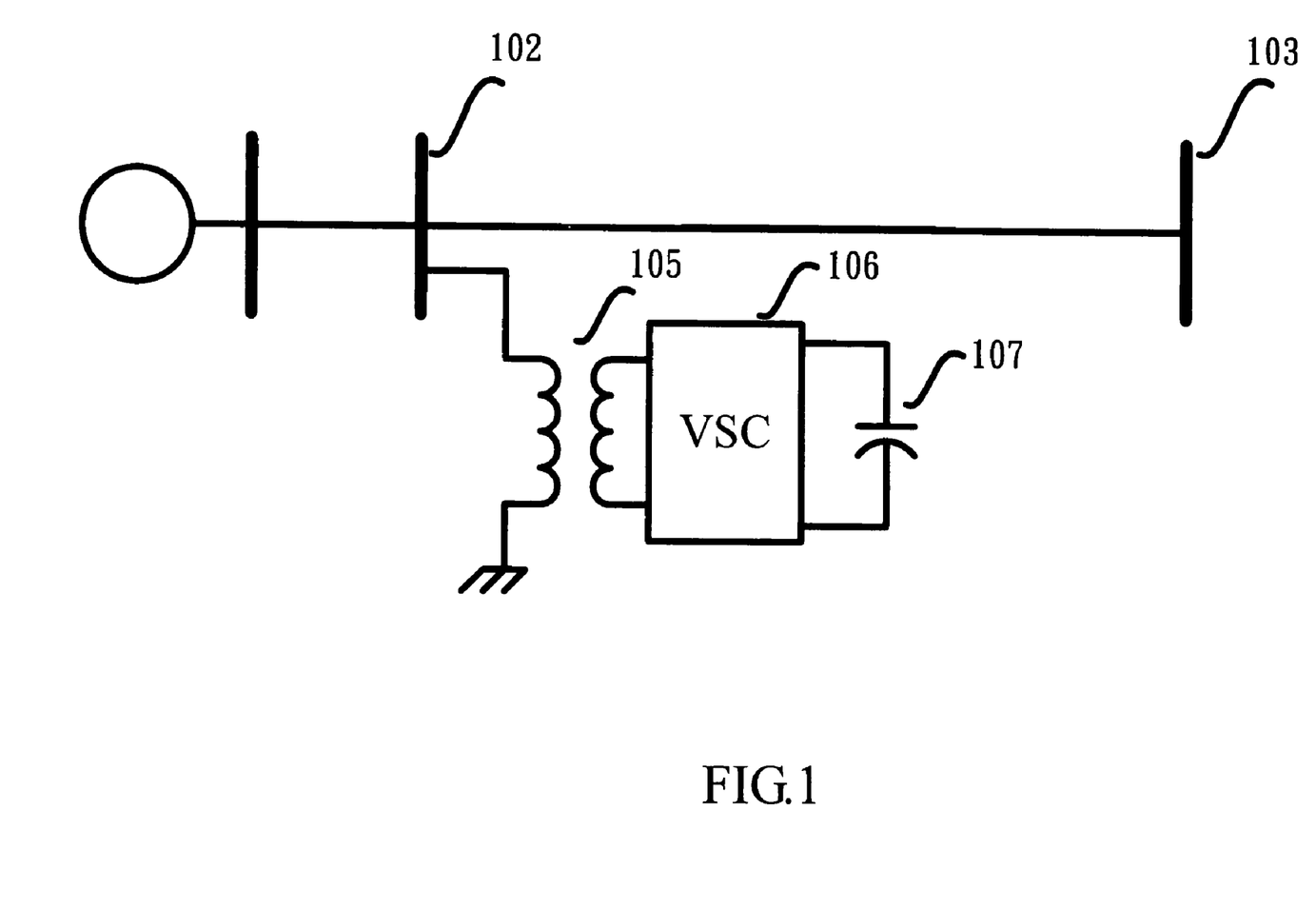
FIG. 1 is a single-line diagram of an electric power system.

With reference to FIG. 1, a STATCOM is installed in shunt with Bus 102 to regulate the voltage of bus 102 and increase the stability of the power system. The STATCOM comprises a shunt transformer 105, a shunt converter 106, and a DC coupling capacitor 107. The DC coupling capacitor 107 stores a DC voltage and connects to the shunt converter 106. The shunt converter 106 is electrically connected to the shunt transformer 105. The shunt transformer 105 is connected to a terminal bus 102.

The converter 106 of the STATCOM may independently acts as an inverter or a rectifier. When the power is transmitted from an AC grid to the DC side coupling capacitor 107, the converter 106 acts as a rectifier, whereas the power flows from the DC side coupling capacitor 107 to the transformer 105, the converter 106 acts as an inverter.

The shunt converter 106 may receive energy from the power gird or release it. The energy infused into the bus 102 is converted to DC side capacitor 107 through the shunt transformer 105 and the shunt converter 106 to adjust the electric power stored in the DC coupling capacitor 107 so that a voltage value in the DC coupling capacitor 107 is constant.

Figure 2:
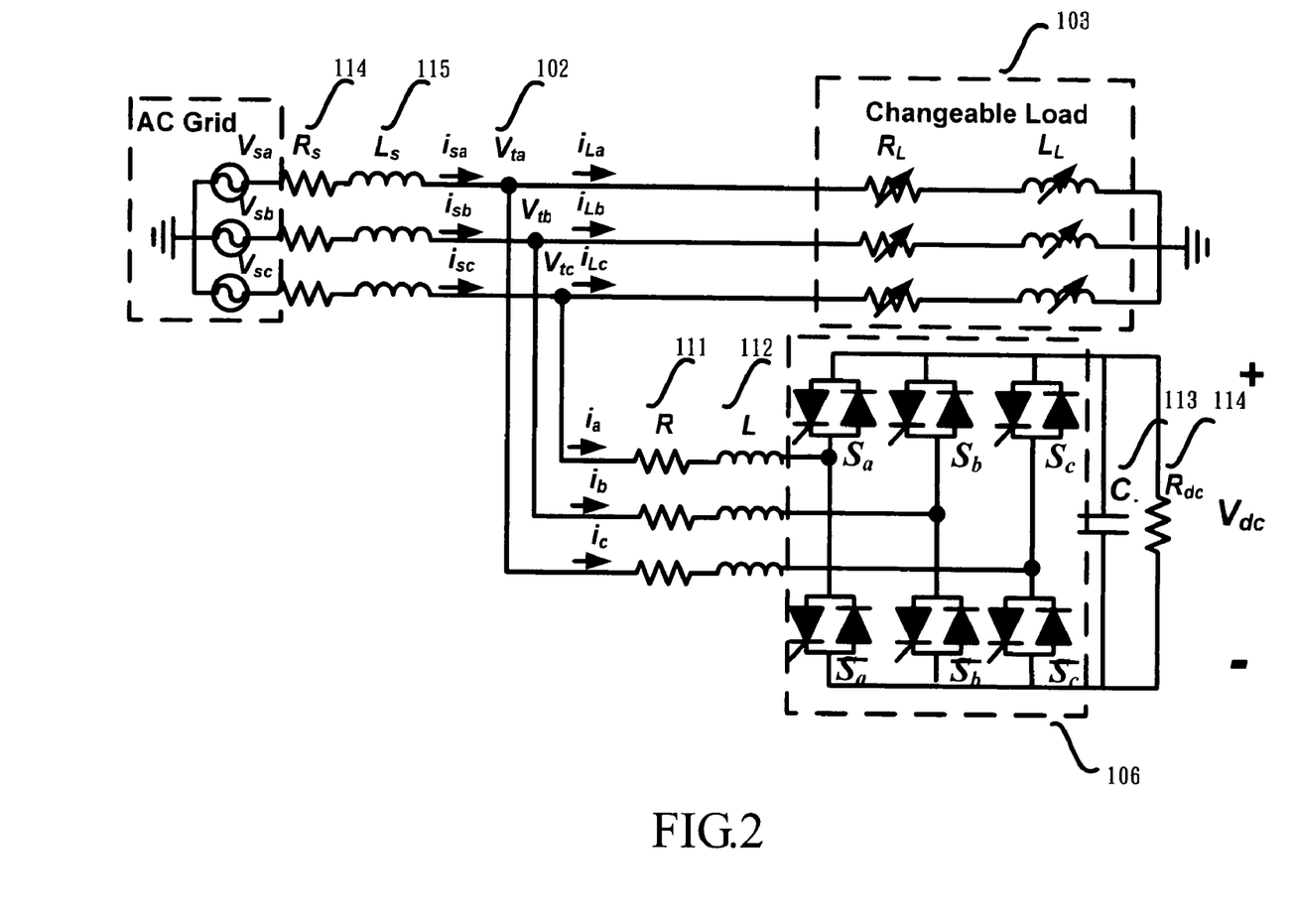
FIG. 2 is a detailed circuit diagram of the electric power system embeeded with static synchronous compensator.

With reference to FIG. 2 illustrating the overall structure of system STATCOM, STATCOM is shunt on the bus 102, and a resistor R 114 and an inductor L 115 are a loss resistor and a loss inductor, respectively, that are equivalent in the transmission line; a resistor R 111 is a leakage resistor of the transmission line and transformer, which is equivalent; an inductor L 112 is a leakage reactance; $S_a$, $S_b$, $S_c$, $\overline{S}_a$, $\overline{S}_b$, and $\overline{S}_c$, six IGBT switches stand for the shunt converter 106; a capacitor C 113 is a coupling capacitor 107 that is equivalent; a resistor $R_{dc}$ 114 stands for a loss when the IGBT switches run. The system status will vary with the changable load 103. Normally, through a switching circuit, the rectifier converts the DC voltage to AC voltage Vs that may be controlled by the proper switching of IGBT.

The DC voltage of capacitor 107 is maintained at desired value by controlling the shunt converter 106. A key point is the way of controlling the shunt converter 106 so as to satisfy the goal of control, without excessive harmonics that affects the quality of electric power and the feedback control signal. In a conventional method of controlling STATCOM, a proportional-integral (PI) voltage regulator is used to generate adequate control signals for controlling the shunt converter 106. In practice, the STATCOM circuit is high non-linear and the linear control theory cannot satisfy its dynamic characteristics.

In a prior art, proposed on July 1993. by C. S. de Araujo and J. C. Castro, "Vectors analysis and control of advanced static VAR compensators," *IEE Proceedings-C*, vol. 140, no. 4, pp. 299-306, a decoupled model is provided for designing the STATCOM on the basis of PI controller. In a prior art, proposed on October 2004 by D. Soto and R. Pena, "Nonlinear control strategies for cascaded multilevel STATCOMs," *IEEE Trans. on Power Delivery*, vol. 19, no. 4, pp. 1919-1927, a feedback linear theory is used to convert a nonlinear model to a linear model for designing a STATCOM controller; the key art is to eliminate a nonlinear element of a non-STATCOM model and add expected dynamic characteristics. It is provided not only with an advantage of simple design of a linear model, but also with the dynamic characteristics of a nonlinear model that remains.

SUMMARY OF THE INVENTION

Thus, in this invention, a method of designing a STATCOM controller based on passivity-based control theory is provided. In a viewpoint of energy, a system is made to be strictly passive for the stability of system. From a model given from the viewpoint of energy, it is apparent that the energy saved in the system and the energy consumed by the system make a closed loop strictly passive, thereby making the system reach an desired state. In this invention, a simple method of designing a STATCOM based on Passivity-Based Control (PBC) is proposed. The energy-dissipative properties of system model are fully retained by considering a changeable load model. Besides, the loss of a converter is also considered, which is superior to the fast response and robustness characteristics of a conventional STATCOM model.

In this invention, there are two parts in a design flow, one for STATCOM model construction and the other for a STATCOM PBC design. The two parts are described below in detail.

Static Synchronous Compensator (STATCOM) Model Constriction

In this invention, an Euler-Lagrange (EL) equation is applied to explain a dynamic behavior of the STATCOM, in which the EL equation is extended from the classical mechanics, explaining the equation of a system. First, the EL equation of a circuit system is defined below:

$$\frac{d}{dt}\left(\frac{\partial L}{\partial \dot{q}}\right) - \left(\frac{\partial L}{\partial q}\right) + \frac{\partial D}{\partial \dot{q}} = F \tag{1}$$

where q is a generalized coordinate for an independent variable, charge quantity in the circuit system;

$\dot{q}$ is an integral on the generalized coordinate q, representing current I;

$D(\dot{q})$ represents a Rayleigh disruptive function of the system, namely the energy, such as loss caused by current flowing through a resistor, consumed in the circuit system;

an external active force function in broad sense is impressed voltage in the circuit system;

The Lagrange function of the system, defined to the difference of energy in an electromagnetic field in the circuit, can be expressed as:

$$L(\dot{q},q) = T(\dot{q},q) - V(q) \quad (2)$$

where $T(\dot{q},q)$ and $V(q)$ means the kinetic energies of system and the potential energies of system, respectively, in which the kinetic energies represent magnetic co-energy generated when the current passes through an inductor, while the potential energies represent magnetic co-energy generated in the case of voltage over a capacitor.

With reference to FIG. 2 illustrating a simplified equivalent circuit of STATCOM, STATCOM is shunt on the bus 102, and a resistor R 111 is the loss of transmission line and the leakage resistance of a transformer; an inductor L 112 is a leakage reactance of the transformer; $S_a$, $S_b$, $S_c$, $\overline{S}_a$, $\overline{S}_b$, and $\overline{S}_c$, six IGBT switches, stand for shunt converters 106; a capacitor C 113 is a coupling capacitor 107 at the DC side that is equivalent; a resistor $R_{dc}$ 114 stands for the switching loss of the IGBT. The voltage of capacitor 113 is maintained at the desired vlaue. In this invention, the PWM strategy is used to generate 6 pulse PWM signals for driving the shunt converter 106. The switching function u of each phase is defined below:

$$u_j = \begin{cases} 1, & S_j: \text{ closed} \\ -1, & \overline{S}_j: \text{ closed} \end{cases} \quad j = a, b, c. \quad (3)$$

Three-phase current $i_a$, $i_b$, and $i_c$ represents a generalized coordinate $q_{La}$, $q_{Lb}$, and $q_{Lb}$ and an integral of the current-based generalized coordinate represents $\dot{q}_{La}$, $\dot{q}_{Lb}$, and $\dot{q}_{Lc}$. Thus, EL parameters corresponding to the STATCOM circuit model are set below:

$$T = \frac{1}{2}L(\dot{q}_{La}^2 + \dot{q}_{Lb}^2 + \dot{q}_{Lc}^2) \quad (4)$$

$$V = \frac{1}{2C}q_C^2 \quad (5)$$

$$D = \frac{1}{2}R(\dot{q}_{La}^2 + \dot{q}_{Lb}^2 + \dot{q}_{Lc}^2) + \frac{1}{2}R_{dc}\left\{\dot{q}_c - \frac{1}{2}(u_a\dot{q}_{La} + u_b\dot{q}_{Lb} + u_c\dot{q}_{Lc})\right\} \quad (6)$$

$$F = [v_{ta} \ v_{tb} \ v_{tc}]^T. \quad (7)$$

where substitution of equations (4)-(7) for equation (1) gives an EL model of STATCOM circuit:

$$L\frac{di_a}{dt} + Ri_a + \frac{1}{2}u_aV_{dc} = v_{ta} \quad (8)$$

$$L\frac{di_b}{dt} + Ri_b + \frac{1}{2}u_bV_{dc} = v_{tb} \quad (9)$$

$$L\frac{di_c}{dt} + Ri_c + \frac{1}{2}u_cV_{dc} = v_{tb} \quad (10)$$

$$C\frac{dV_{dc}}{dt} + \frac{1}{2}(u_ai_a + u_bi_b + u_ci_c) + \frac{V_{dc}}{R_{dc}} = 0. \quad (11)$$

In order to reduce the complexity of calculation of the system, the Park's conversion is used to convert the three-phase EL system to an EL system based on direct-quadrature rotating frame:

$$L\frac{di_d}{dt} + Ri_d + \omega i_q + \frac{1}{2}u_dV_{dc} = v_{td} \quad (12)$$

$$L\frac{di_q}{dt} - \omega i_d + Ri_q + \frac{1}{2}u_qV_{dc} = v_{tq} \quad (13)$$

$$\frac{dV_{dc}}{dt} - \frac{3}{2}(u_di_d + u_qi_q) + \frac{V_{dc}}{R_{dc}} = 0 \quad (14)$$

where the terminal voltages $v_{td}$ and $V_{td}$ are $$v_{td} = v_{sd} - R_s i_{sd} - \Omega L_s i_{sq}$$

$$v_{tq} = v_{sq} + \Omega L_s i_{sd} - R_s i_{sq}$$

The model of changable denotes $$L_L\frac{di_{Ld}}{dt} + R_L i_{Ld} + \omega L_L i_{Lq} = v_{td} \quad (15)$$

$$L_L\frac{di_{Lq}}{dt} - \omega L_L i_{Ld} + R_L i_{Lq} = v_{tq} \quad (16)$$

The controller is designed to generate adequate input signals $u_d$ and $u_q$ to drive the shunt converter 106. The EL model (12)-(14) is rewritten into matrix representation:

$$D\dot{x} + J(u)x + Rx = \epsilon \quad (17)$$

where $$D = \begin{bmatrix} L & 0 & 0 \\ 0 & L & 0 \\ 0 & 0 & C \end{bmatrix}, J_2(u) = \begin{bmatrix} 0 & \omega L & 0.5u_d \\ -\omega L & 0 & 0.5u_q \\ -1.5u_d & -1.5u_q & 0 \end{bmatrix},$$

$$R = \begin{bmatrix} R & 0 & 0 \\ 0 & R & 0 \\ 0 & 0 & R_{dc}^1 \end{bmatrix}, \epsilon = \begin{bmatrix} v_{td} \\ v_{tq} \\ 0 \end{bmatrix}, u = \begin{bmatrix} u_d \\ u_q \end{bmatrix}, \text{ and } x = \begin{bmatrix} i_d \\ i_q \\ V_{dc} \end{bmatrix}$$

where $\Delta$ is a positive-definite diagonal matrix, $\theta$ is interconnection matrix with switches, R is the dissipation matrix, x is the state vector and $\epsilon$ is the voltage source corresponding to ac grid. The skew-symmetry property of the matrix $\theta$ is a typical feature of an EL system, which has no effect on the following energy balance equation.

$$\underbrace{H(T) - H(0)}_{\text{Stored energy}} + \underbrace{\int_0^T x^T Rx dt}_{\text{Dissipated energy}} = \underbrace{\int_0^T x^T \epsilon dt}_{\text{Supplied energy}} \quad (18)$$

where $H = T + S = (\frac{1}{2})x^T \Delta x$ represents the total energy of the average STATCOM model. The energy balance equation describes that the sum of the stored energy $H(T) - H(0)$ and dissipated energy $\int_0^T x^T \epsilon dt$.

Static Synchronous Compensator (STATCOM) Controller Design

In the method of designing the STATCOM based on passivity-based control theory and in consideration of the control of voltage at AC and DC side, the current on the direct-quadrature axis for STATCOM can fast regulate the DC side 107 voltage and maintain the voltage of AC bus 102. Passivity-based control aimed at achieving the signal regulation is obtained by controlling the suitable energy of the closed-loop system, and add the required damping. With the ideal of considering the operation of a changeable load, we describe the system in terms of the source current $i_{s,dq}$ instead of the STATCOM current $i_{dq}$. After using the relationship $i_{dq}=i_{s,dq}-i_{L,dq}$, the dynamic model (17) can be rewritten as $$D\dot{z} = M\dot{w} + Rz + J(u)z - R_1 w + J_1(u)w = \epsilon \quad (19)$$

where $$z = \begin{bmatrix} i_{sd} \\ i_{sq} \\ V_{dc} \end{bmatrix}, w = \begin{bmatrix} i_{Ld} \\ i_{Lq} \\ 0 \end{bmatrix}, M = \begin{bmatrix} L & 0 & 0 \\ 0 & L & 0 \\ 0 & 0 & 0 \end{bmatrix},$$

$$J_1(u) = \begin{bmatrix} 0 & -\omega L & 0 \\ \omega L & 0 & 0 \\ -1.5 u_d & -1.5 u_q & 0 \end{bmatrix}, R_1 = \begin{bmatrix} R & 0 & 0 \\ 0 & R & 0 \\ 0 & 0 & 0 \end{bmatrix}$$

For the control objective, energy shaping and damping injection are used, making the source current $i_{s,dq}$ reach the reference values $i_{s,dq}^*$.

There are two parts in the design flow, the energy shaping and the damping injection.

Damping Injection

A variable reference value z* is set, the variable z in the model of equation (17) is changed into z*, and then the damping $R_m$ is added to increase the asymptotic stability of a system. The model may be changed into:

$$D\dot{z}^* = M\dot{w} + Rz^* + J(u)z^* - R_1 w + J_1(u)w - R_m \tilde{z} = \epsilon \quad (20)$$

where $$R_m = \begin{bmatrix} R_{m1} & 0 & 0 \\ 0 & R_{m2} & 0 \\ 0 & 0 & R_{m3}^1 \end{bmatrix}$$

Energy Shaping

A state variable $\tilde{z} = z - z^* = [i_{sd} - i_{sd}^* \ i_{sq} - i_{sq}^* \ V_{dc} - V_{dc}^*]^T$ of error is defined, and subtraction of equation (20) from equation (19) gives a new model as follows:

$$D\dot{\tilde{z}} + R\tilde{z} + J(u)\tilde{z} + R_m \tilde{z} = 0 \quad (21)$$

1. A system stored energy function $$H = \frac{1}{2} \tilde{z}^T D \tilde{z}$$

is defined, and according to LaShalle's theory, the function is a Lyapunov function that should satisfy a negative semi-definite condition for time differentiation:

$$\dot{H} = -\tilde{z}^T (R + R_m) \tilde{z} \leq 0$$

It proves that model (17) is passive and satisfies asymptotic convergence stability. Finally, according to the condition given above, equation (18) gives controllable input signals $u_d$ and $u_q$;

$$u_d = \frac{2}{V_{dc}^*} \left[ L \frac{di_{Ld}}{dt} - R(i_{sd}^* - i_{Ld})i_d^* - \omega L(i_{sq}^* - i_{Lq}) + R_{m1}(i_{sd} - i_{sd}^*) + v_{td} \right] \quad (22)$$

$$u_q = \frac{2}{V_{dc}^*} \left[ L \frac{di_{Lq}}{dt} + \omega L(i_{sd}^* - i_{Ld}) - R(i_{sq}^* - i_{Lq})i_d^* + R_{m2}(i_{sq} - i_{sq}^*) + v_{tq} \right] \quad (23)$$

Figure 4:
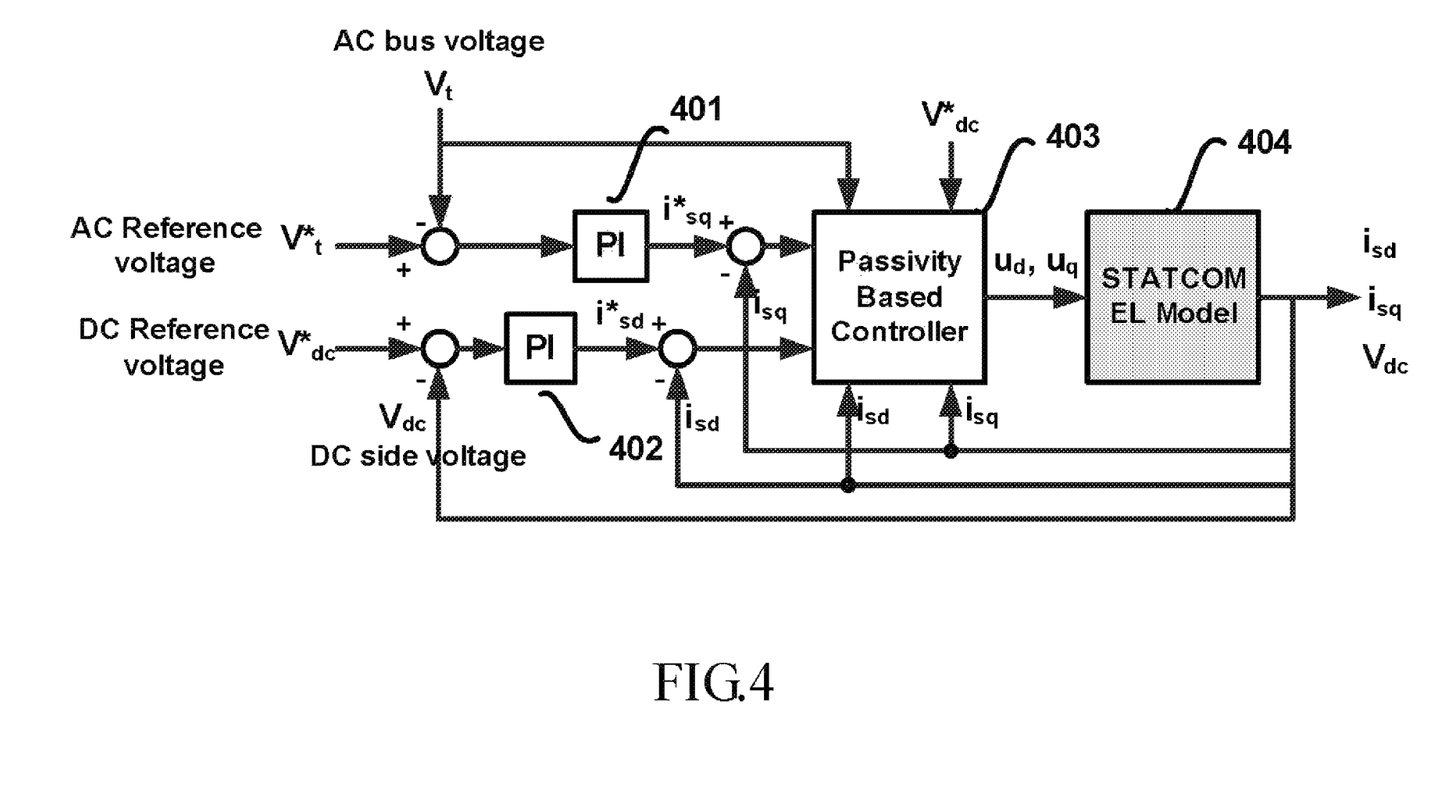
FIG. 4 is a control diagram of designing a static synchronous compensator.

Nevertheless, the parasitic elements in the power system and parameter inaccuracies may led to an incorrect and cause steady-state error in dc-bus output voltage, especially under large disturbance. In order to achieve good tracking performance with strong robustness, the classical PI controller is used to regulate the d-q axis current command $i^*_{sd}$ and $i^*_{sq}$. The control block diagram of the proposed control scheme is shown in FIG. 4. Henceforth, the passivity-based control technique mentioned above is readily employed to the design of a STATCOM controller.

From the above description, the method of designing the static synchronous compensator based on passivity-based control theory construct the STATCOM model in the viewpoint of energy balancing for the Euler-Lagrangian (EL) dynamic model. The model depends on the dynamic response of a changable load, and the controller may follow an adequate control command of fast adjustment as a load characteristic. on the basis of passivity-based control, The STATCOM controller being designed in the technologies of energy shaping and damping injection.

DETAILED DESCRIPTION OF THE PREFERRED EMBODIMENTS

Now, the present invention will be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 3:
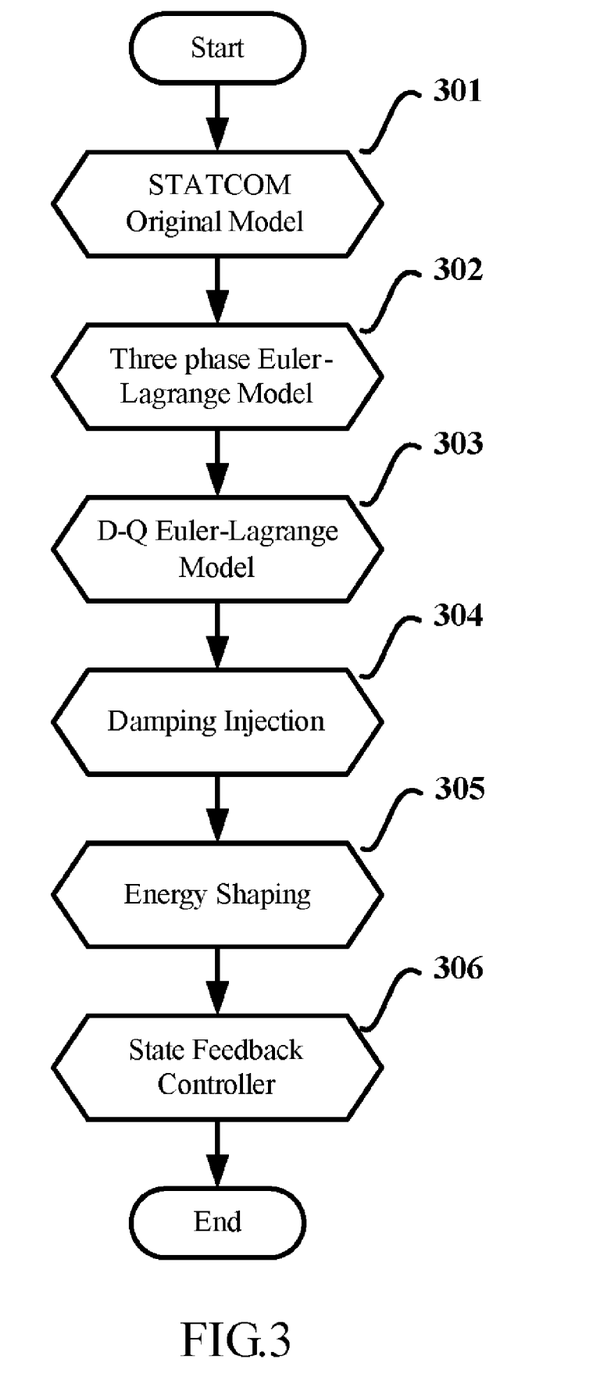
FIG. 3 is a flow chart of control of a static synchronous compensator based on a passivity-based control theory.

With reference to FIG. 3 illustrating a control flow chart of design of a static synchronous compensator based on the passivity-based control theory, the design flow being described below.

At step 301, a model is built according to a STATCOM circuit.

At step 302, according to the system energy given from physical quantity presented out of the circuit, a three-phase EL model of STATCOM is given.

At step 303, in order to reduce the complexity of calculation of the system, Park's transformation is used to convert the three-phase EL system to an EL system based on direct-quadrature rotating frame.

At step 304, for the EL system based on direct-quadrature rotating frame, the technology of damping injection is conducted to increase the asymptoic stability of power system.

At step 305, the error dynamic is defined, and the technology of energy shaping is used so that the potential energy of system is updated to a set of new potential energy, making the system reach a set of minimum potential energy at a default balance point.

At step 306, input-output stability is verified with a Lyapunov function for a feedback control signal $u_d$ and $u_s$.

With reference to FIG. 4 illustrating the control diagram of designing a static synchronous compensator, after subtraction of a DC-side voltage reference value $V^*_{dc}$ from a real value $V_{dc}$, a direct-axis current reference value $i^*_{sd}$ is obtained by an external PI controller 402 adjusting the reactive power; after subtraction of a AC-line voltage reference value $V^*_t$ from a real value $V_t$, a quadrature-axis current reference value $i^*_{sq}$ is given by an external PI controller 401 adjusting the active power. After comparison of the reference value $i^*_{s,dq}$ and the real value $i_{s,dq}$, control input signals $u_d$ and $u_q$ generated by a passivity-based controller 403 is transmitted to STATCOM model 404, thereby system states $i_{s,dq}$ and $V_{dc}$ being formed.

Finally, a test system is used to verify the STATCOM passivity-based controller according to this invention. In an electric power system structure as shown in FIG. 2, resistors 114 and resistances 115 the transmission line of a 161 kV AC grid are connected to a load bus 102 that is connected in series to the changable load 103, in which the load is formed with resistors and resistances. STATCOM is connected in parallel to the bus 102 to compensate the system for reactive power compensation, and system parameters are: AC grid voltage $v_s$=161 kV, transmission line resistor $R_s$=0.001 Ω and inductor $L_s$=5 mH; load resistor $R_L$=50 Ω and inductor $L_L$=14.95 mH; STATCOM-side resistor R=0.001 Ω and inductor L=5 mH; DC-side capacitor C=2200 μF and leakage resistor $R_{dc}$=50 Ω; system reference frequency ω=377 rad/s. In the control procedure, the PI controller generates adequate d-q current $i^*_{s,dq}$, and then the passivity-based controller gets the switching functions $u_d$,$u_q$. There are two cases for analysis, in which case A is implemented for the test of a command tracking and the verification of STATCOM voltage regulation, while case B is implemented for changing the power factor of the load and the test of STATCOM reactive power compensation.

Figure 5:
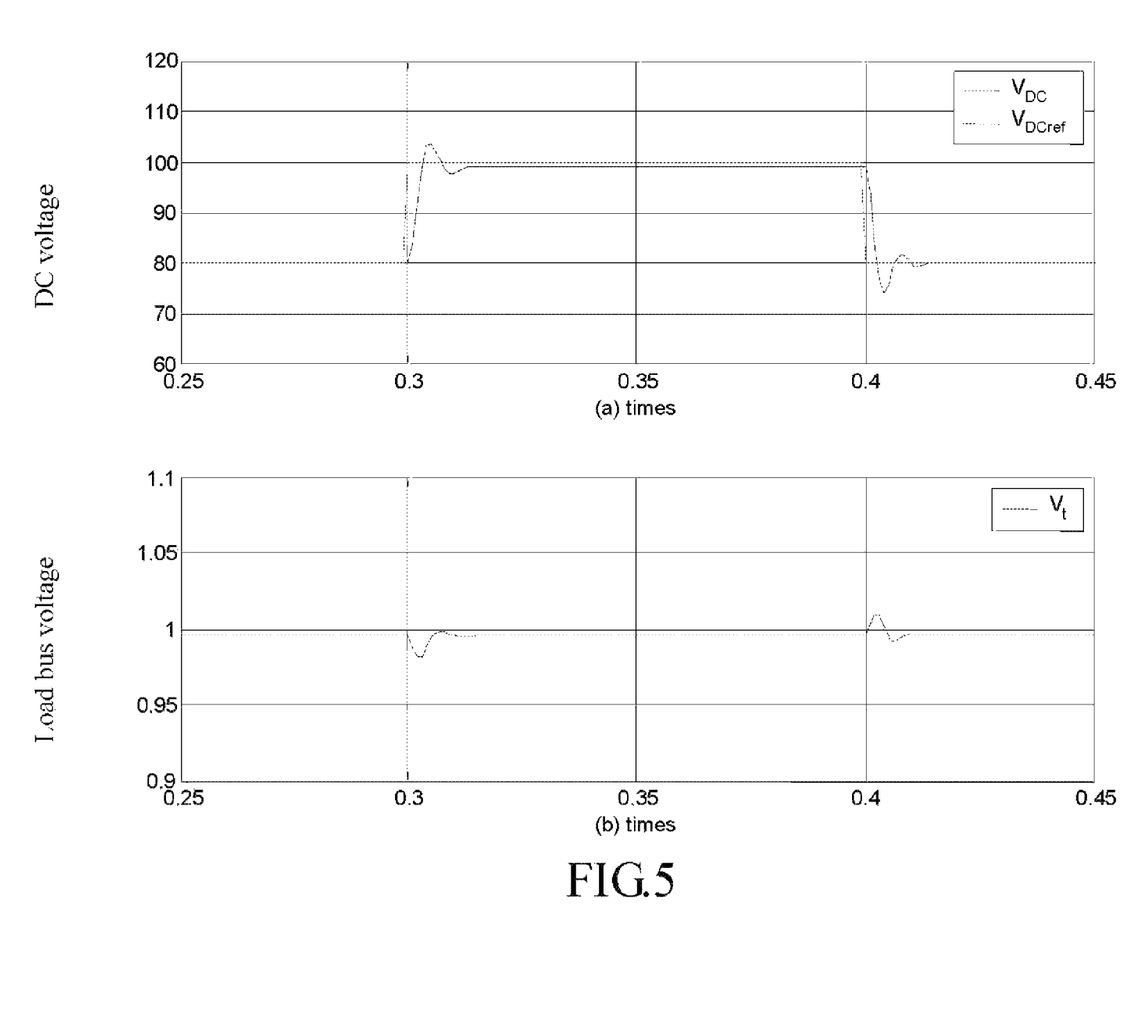
FIG. 5 is a view of a practical embodiment illustrating a case A regarding the DC voltage and the load voltage of STATCOM.

In case A, the DC voltage reference value $V^*_{dc}$ is changed from 80 KV to 100 KV at 0.3 s. As shown in FIG. 5 illustrating the DC voltage $V_{dc}$ and the load voltage $V_t$, the reference command is changed second 0.3, in which the real value of DC voltage varies in a moment, indicating excellent tracking characteristic and strong characteristic and the load voltage $V_t$ is still kept near 1 p.u., indicating an extremely good characteristic of voltage regulation.

Figure 6:
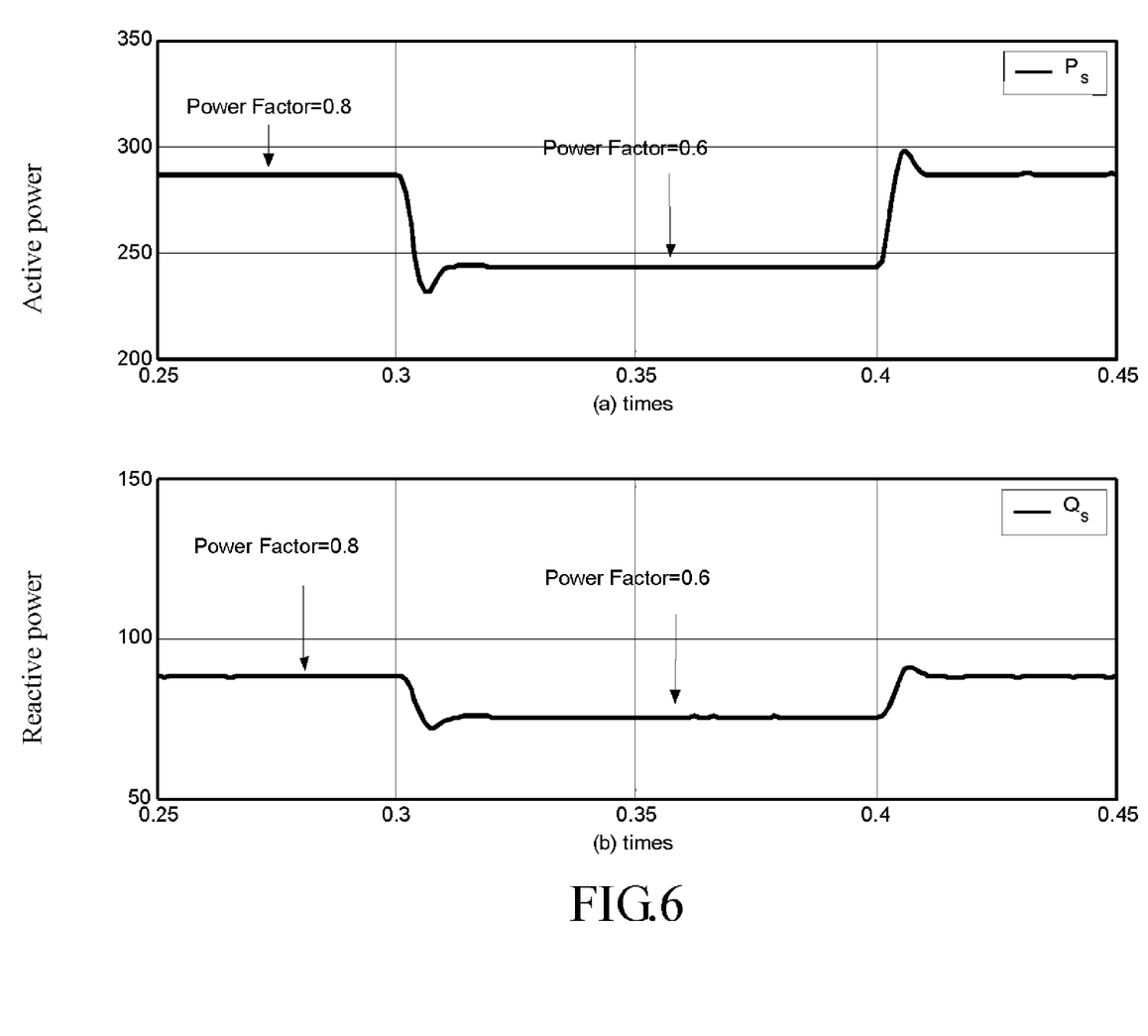
FIG. 6 is a view of a practical embodiment illustrating a case B regarding the active power and reactive power of the load terminal.
Figure 7:
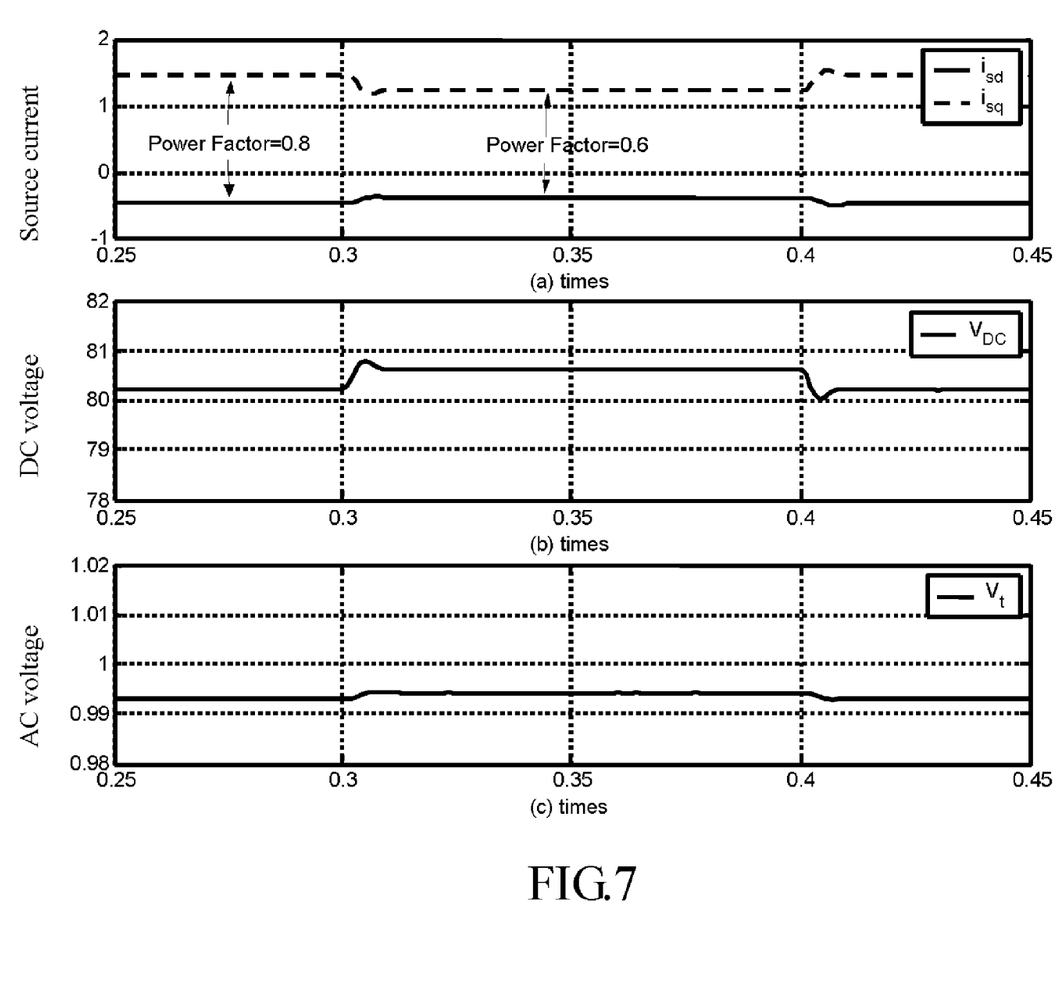
FIG. 7 is a view of the practical embodiment illustrating the case B regarding the AC-bus 102 voltage, the STATCOM DC voltage, and the source current.

In case B, the power factor of the load is changed from 0.8 to 0.6. As shown in FIG. 6 illustrating the active power P and reactive power Q at the load, in which the active power drops in a moment with the variation of load, but the reactive power Q is still kept near the initial value, indicating that STATCOM functions and absorbs redundant reactive power. FIG. 7 illustrates the d-q source current, DC voltage, load voltage. With the variation of load, the quadrature-axis current varies in a moment, while the direct-axis current is still kept near the initial value. With the variation of load, the DC voltage and the load voltage vary just some little, retaining the good characteristics of voltage regulation and reactive power compensation.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for controlling current, in an electric power system based on passivity-based control theory, to regulate a load bus voltage with a static synchronous compensator (STATCOM) controller designed using a STATCOM model, comprising:

constructing a STATCOM model with a viewpoint of energy balancing as a circuit model constructed in Euler-Lagrange (EL) dynamic frame, wherein the model also considers the dynamic response of a changeable load, and is used to determine a control command for fast adjustment of a load characteristic in an electric power system using a STATCOM controller wherein the STATCOM model is given by $$D\dot{z} = M\dot{w} + Rz + J(u)z - R_1 w + J_1(u)w = \epsilon,$$

where $$z = \begin{bmatrix} i_{sd} \\ i_{sq} \\ V_{dc} \end{bmatrix}, \quad w = \begin{bmatrix} i_{Ld} \\ i_{Lq} \\ 0 \end{bmatrix}, \quad M = \begin{bmatrix} L & 0 & 0 \\ 0 & L & 0 \\ 0 & 0 & 0 \end{bmatrix},$$

$$J_1(u) = \begin{bmatrix} 0 & -\omega L & 0 \\ \omega L & 0 & 0 \\ -1.5u_d & -1.5u_q & 0 \end{bmatrix}, \quad R_1 = \begin{bmatrix} R & 0 & 0 \\ 0 & R & 0 \\ 0 & 0 & 0 \end{bmatrix},$$

L=the Lagrangian term of the STATCOM EL model, D,M = the Rayleigh disruptive term of the STATCOM EL model, R,$R_1$=the dissipation term of the STATCOM EL model, J,$J_1$=the interconnection term of the STATCOM EL model, ω=dθ/dt=the angular speed of the ac system, θ=the angle of the STATCOM bus voltage, $\epsilon$=the external force term of the STATCOM EL model, $i_{sd}$,$i_{sq}$=the d-q axis current through a loss resistor (114) and a loss inductor (115) under the direct-quadrature rotating frame, $i_{Ld}$,$i_{Lq}$=the d-q axis current through the changeable load under the direct-quadrature rotating frame, $V_{dc}$=the DC side voltage across a coupling capacitor (113) and the loss resistor, $u_d$,$u_q$=the d-q axis control input of converter (106);

designing a STATCOM controller for controlling current in said electric power system on the basis of passivity-based control using said STATCOM model and technologies of energy shaping and damping injection and using controlled current to regulate a load bus voltage; wherein said damping injection changes the STATCOM model to $D\dot{z}^* = M\dot{w} + Rz^* + J(u)z^* - R_1 w + J_1(u)w - R_m\tilde{z} = \epsilon,$ where $$R_m = \begin{bmatrix} R_{m1} & 0 & 0 \\ 0 & R_{m2} & 0 \\ 0 & 0 & R_{m3}^{-1} \end{bmatrix},$$

and wherein the energy shaping error signal is defined as $\tilde{z}=z-z^*=[i_{sd}-i^*_{sd}, i_{sq}-i^*_{sq}, V_{dc}-V^*_{dc}]^T$; and controlling current in said electric power system on the basis of passivity-based control to regulate the load bus voltage with the STATCOM controller.

2. The method of claim 1, wherein the designed static synchronous compensator uses direct-quadrature-axis current in the EL model to fast regulate the load bus voltage and STATCOM DC voltage.

3. The method of claim 1, wherein three steps of designing the STATCOM are EL model construction, energy shaping, and damping injection.

4. The method of claim 1, wherein the dynamic model of STATCOM is based on the concept of energy balancing so that the Euler-Lagrangian (EL) dynamic model of STATCOM is formed, including a feature of nonlinearity of an original system, and wherein a switching loss of converter (106) and the changeable load are also considered.

5. The method of claim 3, wherein in energy shaping, the energy of the electric power system is corrected for a set of minimum potential energy at a default balance point, an oriented error signal, and a new energy function.

6. The method of claim 3, wherein in damping injection, the asymptotic stability of the electric power system is enhanced.

* * * * *